Nov. 13, 1951  L. E. LA BRIE  2,574,923
TILTING VALVE MASTER CYLINDER FOR HYDRAULIC BRAKES
Filed May 17, 1948  2 SHEETS—SHEET 1

INVENTOR.
LUDGER E. LABRIE.
BY
ATTORNEY

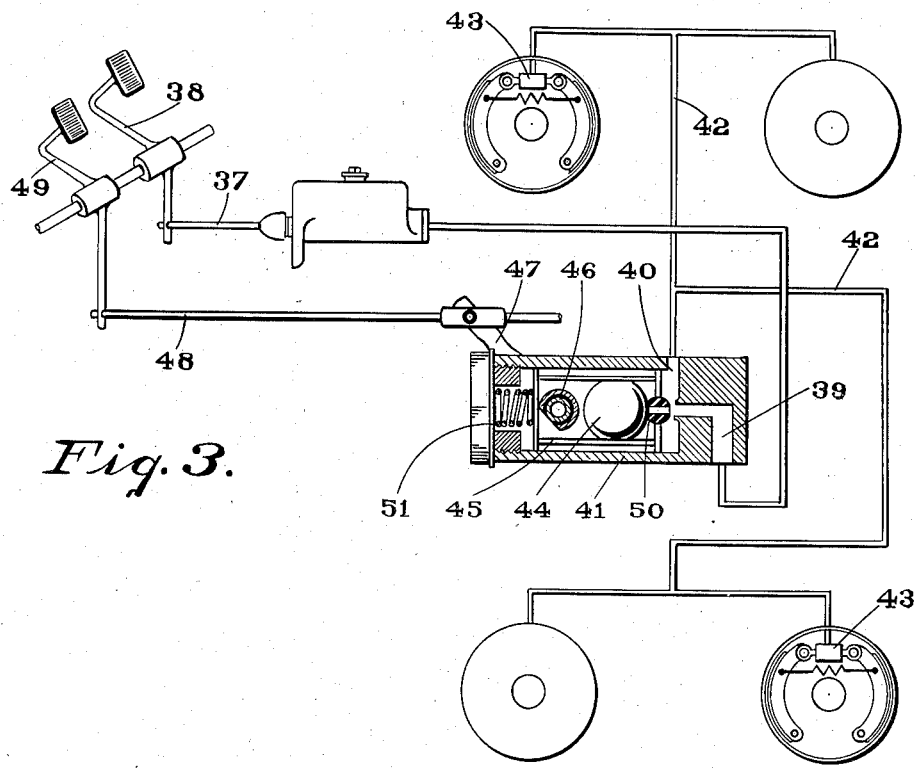

Patented Nov. 13, 1951

2,574,923

UNITED STATES PATENT OFFICE 2,574,923

TILTING VALVE MASTER CYLINDER FOR HYDRAULIC BRAKES

Ludger E. La Brie, Detroit, Mich., assignor to Hydraulic Brake Company, Detroit, Mich., a corporation of California Application May 17, 1948, Serial No. 27,389

2 Claims. (Cl. 60—54.6)

This invention relates to master cylinders for hydraulic brake systems.

In hydraulic brake systems in which a so-called "NoRol" is used to prevent a motor vehicle from rolling backward when stopped on a hill, it sometimes occurs that brake fluid trapped in the wheel cylinders under very high pressure must escape from the master cylinder into the reservoir just as the master cylinder piston returns to its normal position. It is common practice to use in the master cylinders a flexible cup washer which moves with the piston to its normal position past one or more small holes which provide a path for the escape to the reservoir of the trapped brake fluid. When this happens, the high pressure of the brake fluid forces the free thin edges of the flexible cups into the small openings and soon destroys the cups.

One method of overcoming this difficulty is illustrated in my co-pending application, Serial No. 759,839, filed July 9, 1947, now Patent No. 2,552,048. In that application, a tilting valve is provided for opening and closing the passageway between the reservoir and the master cylinder, the valve being tilted from its closed position by a flange on the end of a thimble which slides in the cylinder and which is forced in one direction by the movement of the piston, and in the other direction by the piston return spring. It has been found that when a "NoRol" is used with this type of master cylinder and very high pressure of the fluid occurs at the time the piston returns to its normal position, this very high pressure holds the tilting valve on its seat in spite of the pressure of the master cylinder piston return spring. It has also been found that when a valve of the type illustrated in my co-pending application above referred to is tilted to relieve fluid pressure of 1,000 pounds or over per square inch, the rubber forming the seat for the tilting valve is pulled away from the central metal portion of the tilting valve so that part of the returning brake fluid passes between the rubber and the metal part of the tilting valve rather than between the rubber and the valve seat, and the rubber becomes displaced and eventually destroyed.

In accordance with my present invention, the thimble which serves to tilt the valve on its seat is made an integral part of the piston so that the fluid pressure in the cylinder at the time of tilting the valve acts, in addition to the pressure of the return spring, to move the piston and its attached thimble to tilt the valve. Furthermore, the rubber of the tilting valve is held firmly upon the tilting valve member by a surrounding metallic part of the valve member in a manner to prevent brake fluid under high pressure from passing within the rubber ring forming the valve seat.

My invention is illustrated in the accompanying drawing, in which

Fig. 3 is a diagrammatic illustration of the master cylinder, wheel cylinders and a NoRol fluid locking device as they are used on a motor vehicle.

Figure 1:
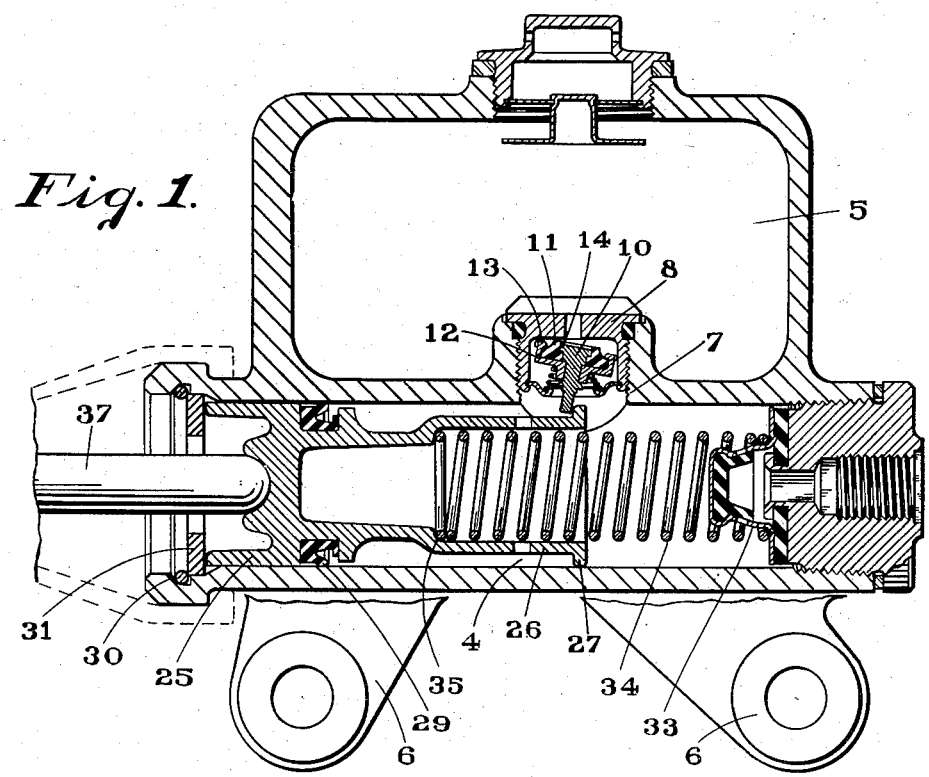
Fig. 1 is a vertical section through the cylinder, reservoir and tilting valve, showing the valve in its normal tilted position.
Figure 2:
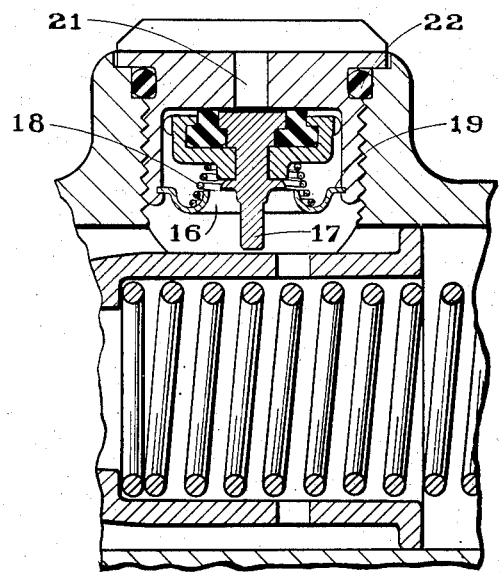
Fig. 2 is a section on an enlarged scale of the valve in its untilted position, and illustrating the rubber ring compressed as it is by the fluid pressure in the cylinder.

Referring to the drawings, a cylinder 4 and a reservoir 5 are formed in a casting supported on the framework of the vehicle by lugs 6. A threaded opening 7, between the reservoir and the cylinder, is closed by a hollow plug 8, which houses a tilting valve, comprising a central metallic member 10, surrounded by a rubber ring 11, which is held in place by a cup 12. The rubber ring 11 is somewhat T-shaped in cross-section, and the cup 12 is provided with an inwardly extending flange 13 which, cooperating with an outwardly extending flange 14 on the central member 10, engage the T-head of the rubber ring to firmly hold it in place under a considerable normal compression. The cup 12 and the central member 10 are assembled together under pressure by a tool which throws the flange 16 outwardly against the base of the cup 12. The central member 10 is provided with a stem 17 which protrudes slightly into the bore of the cylinder 4. A spider 18 is stacked into the opening in the plug 8, and supports a spring 19 which urges the valve towards its seat on the inner face of the plug 8. An opening 21 through the head of the plug affords fluid communication between the reservoir and the cylinder when the valve is tilted. A ring gasket 22 forms a seal between the plug and the cylinder casting.

The piston 25 is provided with an extension 26 of an external diameter somewhat less than that of the cylinder, and having a flange 27 at its end which has a working fit in the cylinder 4 and serves to assist in guiding the piston and to tilt the valve when the piston with its associated thimbe is in its normal position. A ring washer 29, preferably of rubber, is located in a rectangular cross-section groove around the piston. The piston is prevented from moving out of the cylinder by a C-spring 30 and cooperating stop washer 31. The fluid discharge end of the cylinder is provided with a valve permitting flow of brake fluid in both directions, but for maintaining a slight pressure in the fluid lines and wheel cylinders under the influence of the piston return spring 34 which engages a shoulder 35 within the thimble portion of the piston for returning the piston to its normal position.

A pushrod 37 (Fig. 3) is moved towards the cylinder in the usual manner by a pivoted brake pedal 38, causing fluid to flow through the passages 39 and 40 of the "NoRol" cylinder 41 and the tubing 42 to the wheel cylinders 43. A ball 44 is supported within the "NoRol" cylinder 41 upon rods 45 which form a cage movable within the cylinder by a cam 46 attached by a lever 47 and rod 48 with the pivoted clutch pedal 49. The movable cage supports a rubber valve 50.

In the operation of the braking system in which my master cylinder is used, fluid is first introduced into the reservoir 5 and, at the same time, one of the bleeder valves (not shown but always present in a hydraulic brake system) at a wheel cylinder is opened. The brake pedal 38 is then depressed. The first movement of the brake pedal closes the tilting valve and forces air out of the master cylinder past the valve 33 and into the piping to the wheel cylinders. Upon the release of the foot pedal 38, the spring 34 returns the piston 25 to its normal position. At this time, the valve 33 remains closed against the return of air from the piping, and the tilting valve is therefore moved off its seat by the depression created in the cylinder 4, thus permitting a flow of brake fluid into the master cylinder. By repeated movements of the brake pedal 38, and by opening the bleeder valves at the wheel cylinders one at a time, the air is forced out of all of the piping and out of the "NoRol" device and the wheel cylinders. If a small amount of air is left in the master cylinder, it passes out past the tilted valve when the piston is returned to its normal position, and some additional fluid flows into the master cylinder from the wheel cylinders.

In setting the brakes, the first movement of the piston 25 permits the tilting valve to seat while further movement forces brake fluid into the wheel cylinders. Whenever the master cylinder piston is in its normal position, the tilting valve is tilted and the passageway is maintained open between the reservoir and master cylinder. This permits fluid to flow in either direction between the reservoir and master cylinder to compensate for expansion and contraction of the brake fluid due to temperature changes.

When a vehicle driver wishes to hold the vehicle against backing on a hill, he depresses his brake pedal and then depresses his clutch pedal, whereupon the brake pedal may be released. The depression of the clutch pedal rotates the cam 46 of the NoRol and permits the cage 45 to move to the right under the influence of the spring 51 (Fig. 3). Since the vehicle is on a slant, the ball 44 rolls against the rubber valve member 50, thus sealing the passageway so that brake fluid cannot now escape from the wheel cylinders back to the master cylinder. Upon the release of the clutch pedal, the valve member 50 in the "NoRol" is forcibly pulled away from its seat, permitting the brake fluid to flow from the wheel cylinders back to the master cylinder. Under normal operation, the piston in the master cylinder will have been fully released and in its normal position with the tilting valve standing open. The flow of brake fluid from the wheel cylinders will then pass around the tilting valve and into the reservoir without obstruction. It sometimes happens, however, that the clutch pedal will be released before the brake pedal has been returned entirely to its normal position. When this happens, fluid will have been drawn into the master cylinder, past the tilting valve, by the almost complete return of the brake pedal to its normal position, so that when the clutch pedal is released and a flow of brake fluid from the wheel cylinders to the master cylinder occurs under the high pressure which has been applied to the wheel cylinders to hold the vehicle against rolling backwards, the tilting valve will be closed, and the high pressure will be communicated to the underside of the tilting valve while it is in its closed position. This high pressure on the tilting valve would prevent the valve from tilting under the influence of the master piston return spring 34, but since the high pressure is also communicated to the piston itself, this pressure assisting the spring 34 is sufficient to tilt the valve and allow the fluid to escape from the master cylinder into the reservoir. As the tilting valve is tilted, there is a tendency for the fluid under pressure to force the rubber of the tilting valve out of its recess, but this tendency is overcome by the inwardly extending locking flange of the cup 12 cooperating with an outwardly extending flange on the central member 10 of the valve.

Although I have shown and described my invention with respect to certain details of construction, I do not wish to be unduly limited thereto, certain variations from the disclosure being possible without departing from the spirit and scope of my invention.

I claim:

1. In a master cylinder for hydraulic brake systems, a reservoir for operating fluid, a piston in the cylinder, a spring in the cylinder for returning the piston to its normal position, there being a passageway from the reservoir into the cylinder beyond the pressure stroke of the piston, a valve for closing said passageway opening toward the cylinder and having a stem projecting into the cylinder, a spring tending to hold said valve on its seat, the piston being provided with an integral tubular extension of less external diameter than the cylinder and provided with a flange at its extremity of a diameter substantially filling the cylinder for engagement with the stem of said valve to tilt the valve when the piston is in its normal position, the first movement of the piston on its pressure stroke moving the flange out of contact with the valve stem permitting the valve to seat under the influence of its spring.

2. In a hydraulic brake system, a master cylinder and an associated reservoir, a valve between the cylinder and the reservoir, a flat valve seat upon which said valve seats with the stem of the valve protruding into the cylinder, a piston in the cylinder having a rubber sealing ring thereon, the piston being provided with an integral hollow extension into the pressure part of the cylinder, the extension being of a diameter such that the protruding end of the valve stem does not touch it, a flange on the end of the piston extension of a diameter to have a sliding fit in the cylinder and positioned so that it engages the protruding end of the valve to tilt it on its seat, and a spring for returning the piston to normal position seating within the hollow portion of the piston extension.

LUDGER E. LA BRIE.

REFERENCES CITED

The following references are of record in the file of this patent:

UNITED STATES PATENTS

| Number | Name | Date |
|---|---|---|
| 1,430,746 | Loughead | Oct. 3, 1922 |
| 2,000,187 | Oliver | May 7, 1935 |
| 2,095,752 | La Brie | Oct. 12, 1937 |
| 2,163,874 | Goepfrich | June 27, 1939 |
| 2,258,257 | Main | Oct. 7, 1941 |
| 2,314,553 | Palm | Mar. 23, 1943 |
| 2,392,234 | Downey | Jan. 1, 1946 |

FOREIGN PATENTS

| Number | Country | Date |
|---|---|---|
| 539,095 | Great Britain | Aug. 27, 1941 |